(12) United States Patent
Sakai

(10) Patent No.: US 6,384,511 B1
(45) Date of Patent: May 7, 2002

(54) DEVICE HAVING VIBRATION WAVE MOTOR AS DRIVING SOURCE

(75) Inventor: Akihiko Sakai, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/471,020

(22) Filed: Dec. 23, 1999

(30) Foreign Application Priority Data

Dec. 28, 1998 (JP) ............................................ 10-373705

(51) Int. Cl.[7] .......................... H02N 2/00; G03G 15/00
(52) U.S. Cl. .................................. 310/316.01; 310/317
(58) Field of Search ...................... 310/316.01, 316.02, 310/317

(56) References Cited

U.S. PATENT DOCUMENTS

| | | | | |
|---|---|---|---|---|
| 4,998,048 A | * | 3/1991 | Furutsu | 318/116 |
| 5,010,222 A | * | 4/1991 | Suganuma | 318/116 |
| 5,136,215 A | * | 8/1992 | Izukawa | 318/116 |
| 5,157,300 A | * | 10/1992 | Kataoka et al. | 310/323.01 |
| 5,500,578 A | * | 3/1996 | Kawamur | 318/116 |
| 5,616,979 A | * | 4/1997 | Nishikawa | 310/316.01 |
| 6,049,156 A | * | 4/2000 | Yamamoto et al. | 310/316.01 |
| 6,054,795 A | * | 4/2000 | Yamamoto et al. | 310/316.01 |
| 6,084,334 A | * | 7/2000 | Yamamoto et al. | 310/316.01 |
| 6,114,818 A | * | 9/2000 | Ohtsubo et al. | 318/49 |
| 6,163,100 A | * | 12/2000 | Morizaki et al. | 310/317 |

FOREIGN PATENT DOCUMENTS

| | | | |
|---|---|---|---|
| JP | 58-14682 | 1/1983 | H04N/5/30 |
| JP | 59-204477 | 11/1984 | H02N/11/00 |
| JP | 60-176470 | 9/1985 | H02N/2/00 |
| JP | 63-1379 | 1/1988 | H02N/2/00 |

\* cited by examiner

*Primary Examiner*—Thomas M. Dougherty
(74) *Attorney, Agent, or Firm*—Fitzpatrick, Cella, Harper & Scinto

(57) ABSTRACT

A vibration wave motor having improved driving characteristics includes a mode for driving the vibration wave motor at a second speed set higher than a first speed which is a normal speed of the motor required in normal processing performed by driving the vibration wave motor. When a use state of a device having the vibration wave motor satisfies one or plural preset conditions, the vibration wave motor is driven at the second speed.

25 Claims, 9 Drawing Sheets

FIG. 7

| (a) APPARATUS STATE FOR STARTING HIGH SPEED ROTATION | (b) HIGH SPEED ROTATION EXECUTED TERM (sec) | (c) TERM BETWEEN HIGH SPEED ROTATION OPERATIONS (min) |
|---|---|---|
| IMMEDIATELY AFTER POWER ON | 60 | — |
| UPON STARTING IMAGE FORMING OPERATION | 30 | — |
| UPON RECEIVING IMAGE FORMING PREPARATION SIGNAL FROM FACSIMILE APPARATUS | 10 | — |
| UPON RECEIVING IMAGE FORMING PREPARATION SIGNAL FROM LAN INTERFACE APPARATUS | 10 | — |
| UPON RECEIVING IMAGE FORMING PREPARATION SIGNAL FROM PRINTER FORMAT APPARATUS | 10 | — |
| PERIODICALLY EXECUTE AFTER POWER ON REGARDLESS OF STATE | 30 | 120 |
| IMAGE FORMING OPERATION IS COMPLETED, AND MEASURED wf VALUE IS LOWER THAN PREDETERMINED VALUE | 60 | — |

FIG. 8
| APPARATUS STATE FOR INHIBITING HIGH SPEED ROTATION |
| DURING EXECUTING IMAGE FORMING OPERATION |
FIG. 9
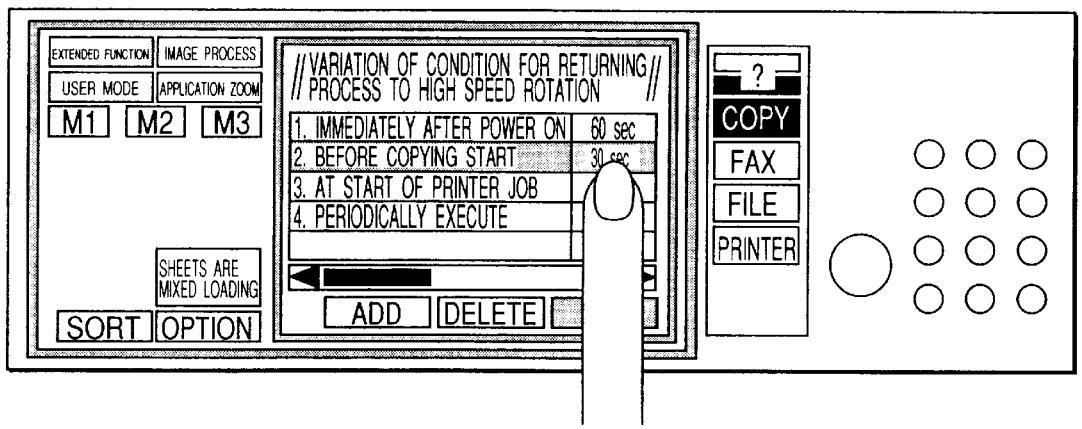
FIG. 10
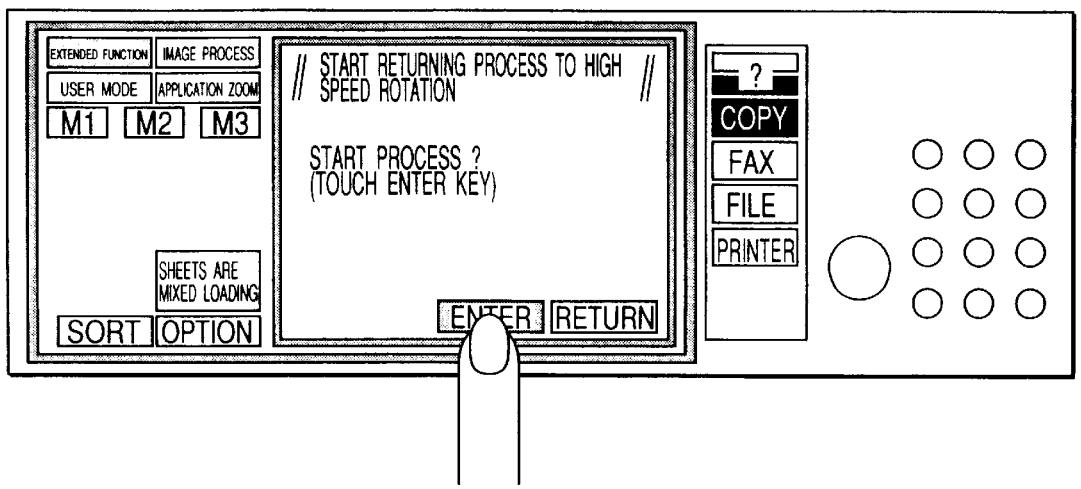

DEVICE HAVING VIBRATION WAVE MOTOR AS DRIVING SOURCE

BACKGROUND OF THE INVENTION

1. Field of the Invention

The present invention relates to a vibration wave driving device such as a vibration wave motor, etc., an image forming device and a device using the vibration wave motor as a driving source.

2. Related Background Art

A controller utilizing a motor as a driving source generally requires that a driving member be repeatedly operated by the motor while a certain precise level is held.

In particular, in an image forming device in an electrophotographic system, the use of a motor of a higher rotational accuracy is required as a motor for driving a photosensitive drum used as an image bearing member to form a high accuracy image, or as a motor for driving a transfer member for driving a transfer member conveying belt, e.g., an endless belt which conveys a transfer member such as transfer paper, etc., toward a transfer position of the photosensitive drum. To achieve this object, it has been proposed to use a vibration wave device such as a vibration wave motor as a motor for driving the photosensitive drum, or a motor for driving the transfer member.

For example, as is publicly known in Japanese Patent Application Laid-Open No. 58-14682, etc., the vibration wave motor as a vibration wave device is a motor utilizing vibration. For example, the vibration wave motor is constructed of a vibration member formed by joining an electromechanical energy conversion element such as a piezoelectric element to an elastic member made of a metal, etc., and a contact member brought into pressure contact with the elastic member. A driving vibration (travelling wave vibration) is generated on a contact face of the elastic member in contact with the contact member by applying a periodic signal to the piezoelectric element. The vibration member and the contact member are relatively moved by frictional vibration energy of this driving vibration.

Here, for example, when the vibration member is set to a stator, the contact member is set to a rotor, and the rotor is attached to a rotating shaft arranged at a center of rotation of the rotor, the rotating shaft is rotated integrally with this rotor.

As described in detail in Japanese Patent Application Laid-Open Nos. 63-1379, 60-176470, 59-204477, etc., with respect to driving control of the vibration wave motor, a driving frequency, a driving voltage and a pulse width of the driving voltage signal used as control amounts are adjusted at any time in accordance with the difference between a speed signal from a speed detecting means, such as an encoder signal for detecting the rotation of the vibration wave motor and a preset target speed. Thus, stable rotating performance at constant speed is realized by so-called speed feedback loop control.

SUMMARY OF THE INVENTION

An object of the invention is to provide a vibration wave driving device and an image forming device capable of improving the driving characteristics of a vibration wave device such as a vibration wave motor.

In one aspect of the application in the above object, a high speed mode for driving the vibration wave motor at a high speed in comparison with a normal driving speed is set, and a use or operating state of the device, etc., is determined and rotating characteristics of the vibration wave motor are improved by driving the vibration wave motor in the high speed mode in accordance with the results of this determination.

In one aspect of the application, a rotational speed of the vibration wave motor in the high speed mode is set to be higher than a driving speed at the time of a predetermined operation performed by driving the vibration wave motor.

In one aspect of the application, a high speed mode, for driving the vibration wave motor at a speed higher than a driving speed during performing of, specific processing, is set in a device for performing plural processings by driving the vibration wave motor, it is determined whether or not it conforms to a predetermined condition during execution of this high speed mode, and in which execution of the high speed mode is inhibited while performing the specific processing and is allowed in accordance with a use state of the device, etc.

In one aspect of the application, a driving mode for improving stable rotating characteristics of the vibration wave motor is provided and is selectively executed by discriminating a situation of the device, etc.

Other objects of the present invention will become more apparent from embodiments explained below.

BRIEF DESCRIPTION OF THE DRAWINGS

FIG. 7 is a view showing one example of a high speed rotation executing condition setting table of FIG. 4;

FIG. 8 is a view showing one example of a high speed rotation inhibiting condition setting table of FIG. 4;

FIG. 9 is a view showing one example of an operation screen for changing contents of the high speed rotation executing condition setting table of the image forming device of FIG. 1;

FIG. 10 is a view showing one example of an operation screen for designating high speed rotation execution by an operator of the image forming device of FIG. 1;

BRIEF DESCRIPTION OF THE PREFERRED EMBODIMENTS

Figure 1:
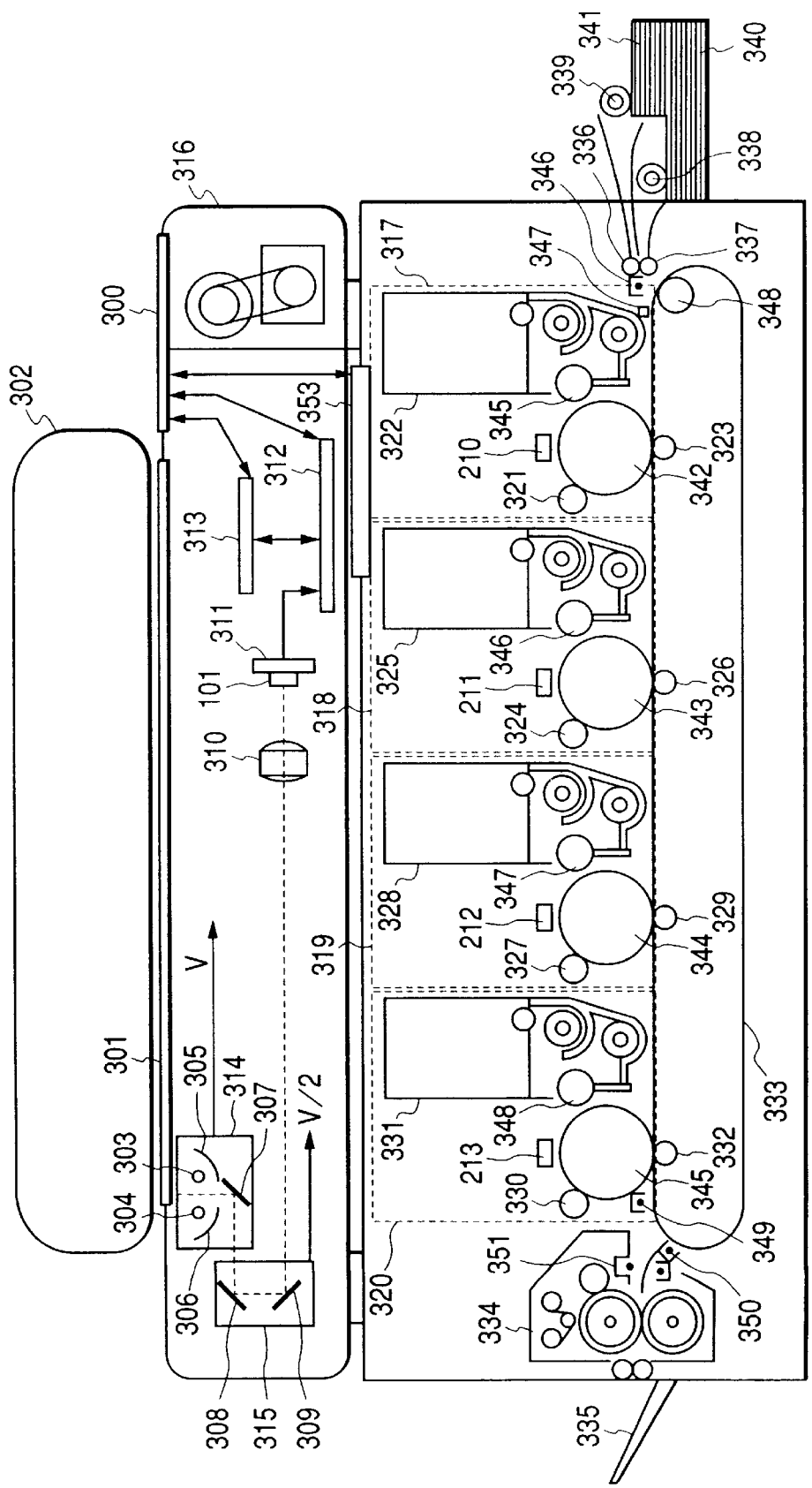
FIG. 1 is a view showing the entire construction of an image forming device showing one embodiment of the present invention.
Figure 2:
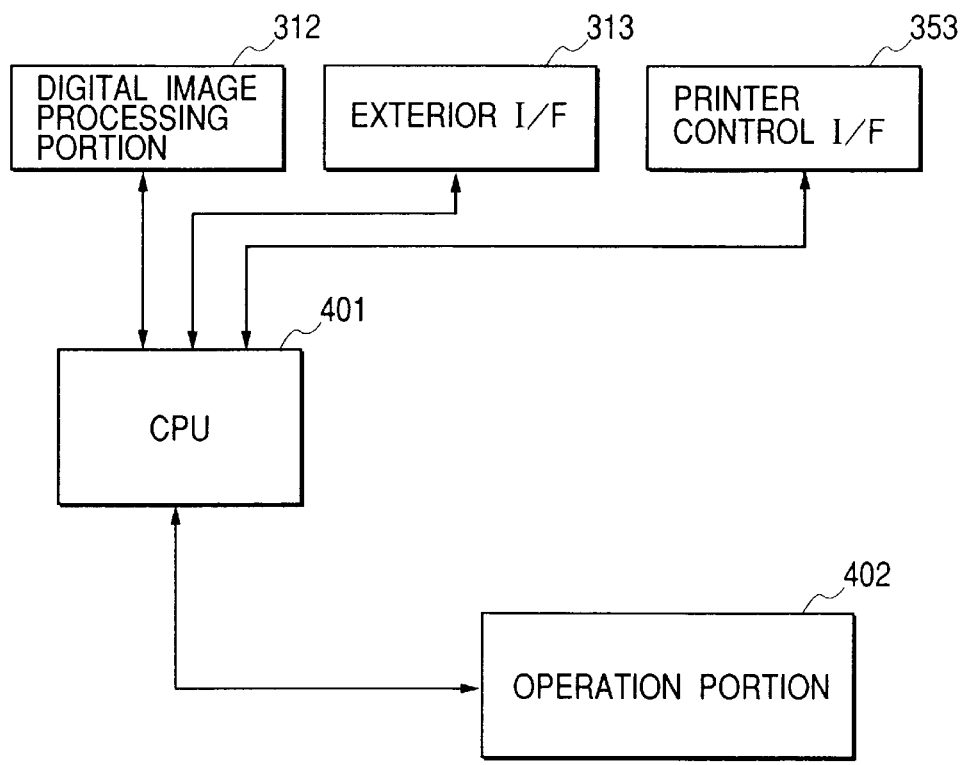
FIG. 2 is a block diagram showing the construction of a control portion of FIG. 1.

FIGS. 1 and 2 are views showing the construction of an image forming device in one embodiment of the present invention. A basic construction of the image forming device will next be explained on the basis of FIGS. 1 and 2.

Construction of Color Reader Portion

The construction of a color reader portion will first be explained.

FIG. 1 shows an entire construction of the image forming device. Reference numerals 101, 311 and 300 respectively designate a CCD, a substrate mounting the CCD 101 thereto, and a control portion for controlling an entire operation of the image forming device. Reference numerals 312, 301 and 302 respectively designate a printer processing portion, an original base glass (platen), and an original paper sheet feeder (DF) (a construction for mounting an unillustrated mirror face pressing plate may also be used instead of this original paper sheet feeder 302). Each of reference numerals 303 and 304 designates a light source (a halogen lamp or a fluorescent light) for illuminating an original. Reference numerals 305 and 306 respectively designate reflecting shades for converging light of the light sources 303, 304 to the original. Reference numerals 307 to 309 designate mirrors. Reference numeral 310 designates a lens for converging reflected light or projected light from the original onto the CCD 101. Reference numeral 314 designates a carriage for housing the halogen lamps 303, 304, the reflecting shades 305, 306 and the mirror 307. Reference numerals 315 and 313 respectively designate a carriage for housing the mirrors 308 and 309, and an exterior interface (I/F) with other devices. Note that the carriage 314 is mechanically moved at a speed V and the carriage 315 is mechanically moved at a speed V/2 in a direction perpendicular to an electric scanning (main scanning) direction of the CCD 101 so that an entire face of the original is scanned (sub-scanned).

As shown in FIG. 2, the control portion 300 is constructed by a CPU 401 and an operation portion 402. The CPU 401 has an I/F for transmitting and receiving information for control to/from each of a digital image processing portion 312, an exterior I/F 313 and a printer control I/F 353.

The operation portion 402 is constructed by a liquid crystal with a touch panel in order for an operator to input contents of processing execution and to be notified of information and warnings, etc., with respect to the processing.

Figure 3:
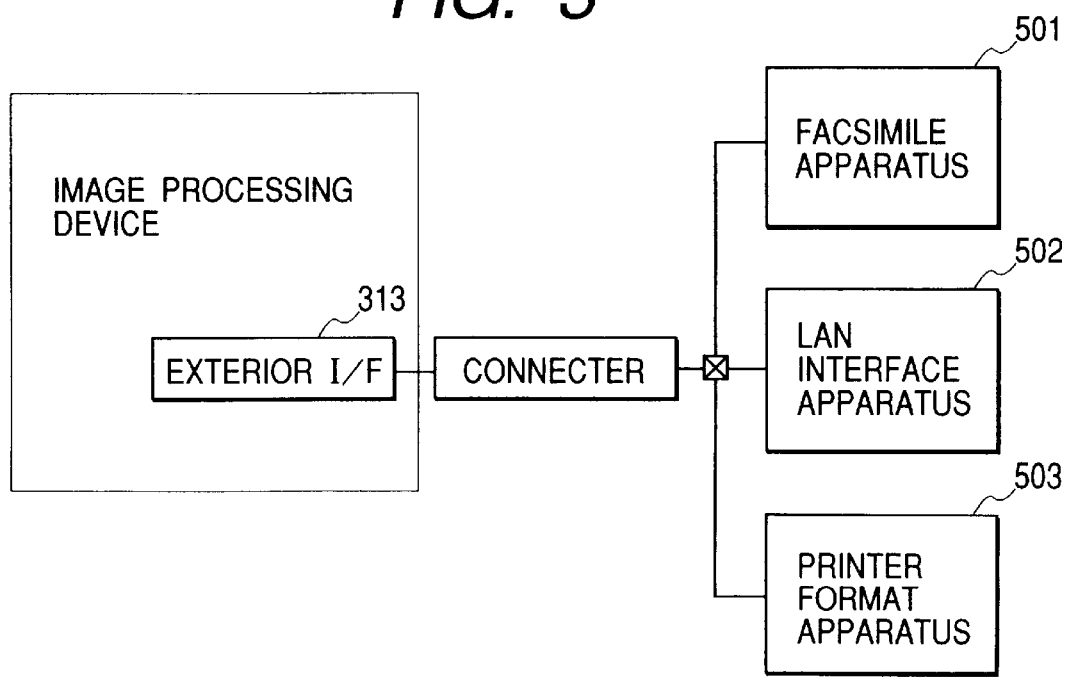
FIG. 3 is a view showing the construction of an exterior interface of FIG. 1.

The exterior I/F 313 is an interface for transmitting and receiving image information and code information, etc., to/from the exterior of the image processing device. Concretely, as shown in FIG. 3, a facsimile apparatus 501, a LAN interface apparatus 502, a printer format apparatus 503, etc., can be connected to the exterior I/F 313. The transmission and reception of the image information and the code information with respect to the facsimile apparatus 501, the LAN interface apparatus 502 and the printer format apparatus 503 are controlled by mutual communication between the facsimile apparatus 501, the LAN interface apparatus 502, the printer format apparatus 503 as respective connecting devices and the CPU 401 of the control portion 300.

Construction of Printer Portion

The construction of the printer portion will next be explained.

In FIG. 1, reference numeral 353 designates a printer control I/F for receiving a control signal from the CPU 401 of a color reader portion shown in FIG. 2. The printer portion performs an operation explained below on the basis of the control signal from the printer control I/F 353.

An image forming portion will subsequently be explained in detail. In FIG. 1, reference numerals 317, 318, 319 and 320 respectively designate an M-image forming portion, a C-image forming portion, an Y-image forming portion and a K-image forming portion. All of the image forming portions 317 to 320 have the same construction. Accordingly, the M-image forming portion 317 will be explained in detail and explanations of the other image forming portions are omitted in the following description.

In the M-image forming portion 317, reference numeral 342 designates a photosensitive drum for forming a latent image on its surface by light from an LED array 210. A primary charger 321 charges the surface of the photosensitive drum 342 to a predetermined potential so as to prepare for the formation of the latent image. A developing device 322 develops the latent image on the photosensitive drum 342 and forms a toner image. Note that the developing device 322 includes a sleeve 345 for developing the latent image by applying a developing bias. A transfer charger 323 performs a discharging operation from the rear face of a transfer material conveying belt (hereinafter briefly called a transfer belt) 333 of an endless belt shape for conveying a transfer material. The toner image on the photosensitive drum 342 is transferred to a sheet of recording paper, etc., on the transfer belt 333. Since transfer efficiency is preferable in this embodiment, no cleaner portion is arranged. However, there is no problem even when the cleaner portion is arranged.

A procedure for forming an image on a transfer material, such as a sheet of recording paper, will next be explained. The transfer material, such as a sheet of recording paper stored in cassettes 340, 341 is supplied onto the transfer belt 333 by pickup rollers 339, 338 and paper feed rollers 336, 337 for every sheet. The fed sheet of recording paper is charged by an adsorption charger 346.

A transfer belt roller 348 drives the transfer belt 333 and the transfer material is charged by the transfer belt roller 348 and the adsorption charger 346 as a pair so that the transfer material is adsorbed to the transfer belt 333. A paper leading end sensor 347 detects a leading end of the transfer material on the transfer belt 333. A detecting signal of the paper leading end sensor is used as a sub-scanning synchronous signal when a video signal is transmitted from a printer portion to a printer portion.

Thereafter, the transfer material is conveyed by the transfer belt 333 and toner images are formed on surfaces of the image forming portions 317 to 320 in an order of M-C-Y-K. The electrical charge of the transfer material after passing through the K-image forming portion 320 is removed therefrom by an electricity removing charger 349 to facilitate separation of the transfer material from the transfer belt 333. Thereafter, the transfer material is separated from the transfer belt 333. A separation charger 350 prevents an image disturbance caused by separating discharge when the transfer material is separated from the transfer belt 333. The separated transfer material is charged by pre-fixing chargers 351 to prevent image disturbance by compensating adsorption force of a toner. Thereafter, the toner image is thermally fixed by a fixing device 334 and the paper sheet is then discharged to a paper discharging tray 335.

In this embodiment, a vibration wave motor is used as a drive motor for rotating the photosensitive drums 342 to 345 and the transfer belt 333. In driving control of this vibration wave motor, a driving frequency and a driving voltage of the vibration wave motor and a pulse width of the driving voltage are controlled in accordance with a speed detecting signal for stably rotating the vibration wave motor at a constant speed.

Figure 4:
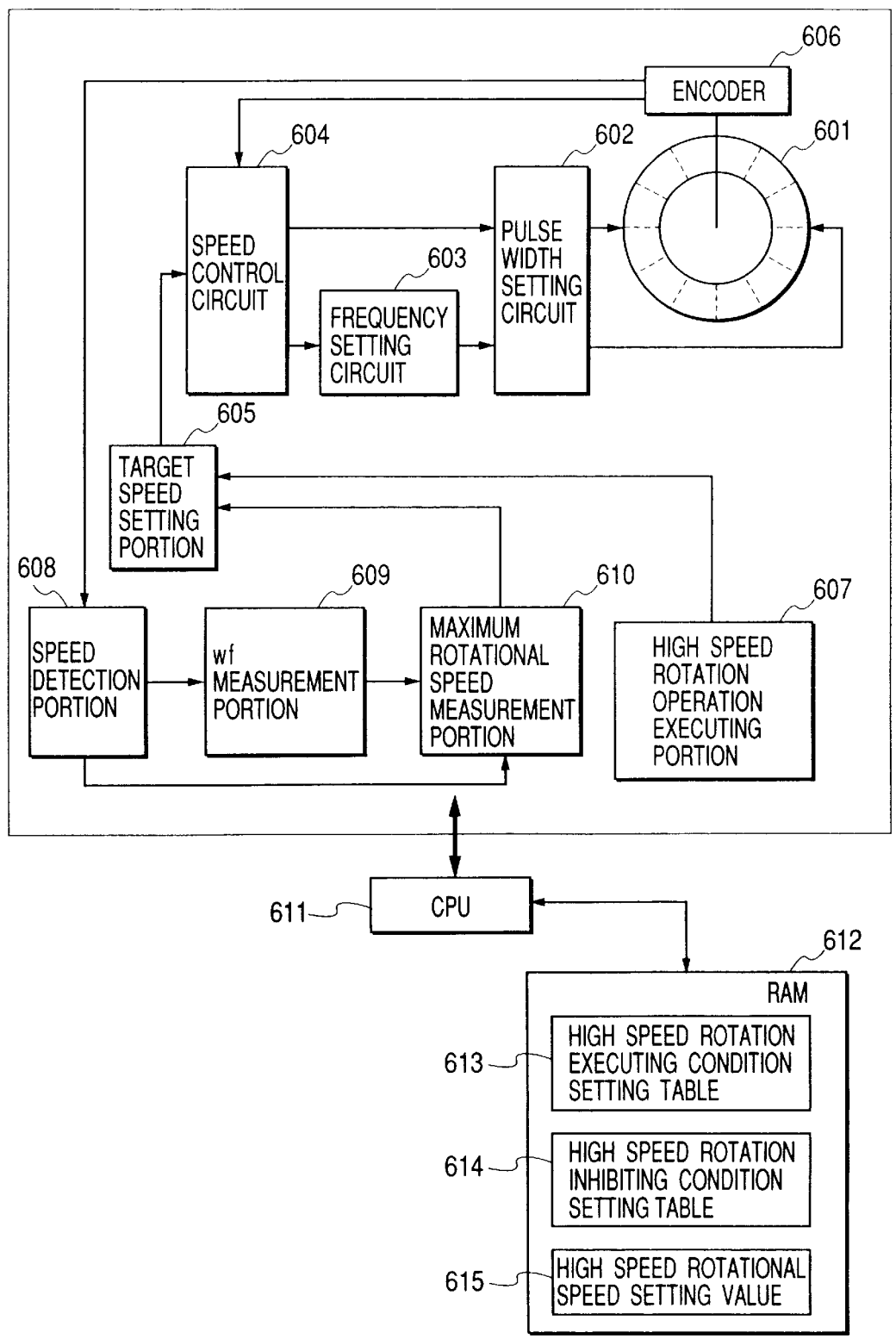
FIG. 4 is a block diagram showing one embodiment of a control method of a vibration wave motor.

FIG. 4 is a block diagram of a control circuit of the vibration wave motor in this embodiment.

In FIG. 4, an encoder 606 is connected to a vibration wave motor 601 and the number of rotations of the vibration wave motor 601 is input to a speed control circuit 604. The speed control circuit 604 performs speed feedback loop control using a frequency setting circuit portion 603 and a pulse width setting circuit 602 on the basis of the rotation number of the encoder 606, so as to rotate the vibration wave motor at a target speed set by a target speed setting portion 605.

Figure 5A:
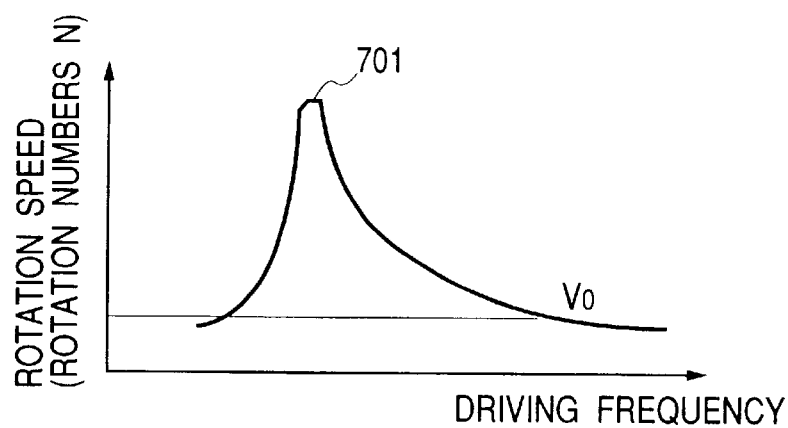
FIGS. 5A, 5B and 5C are graphs showing the relation of a driving frequency and a rotation number of the vibration wave motor.
Figure 5B:
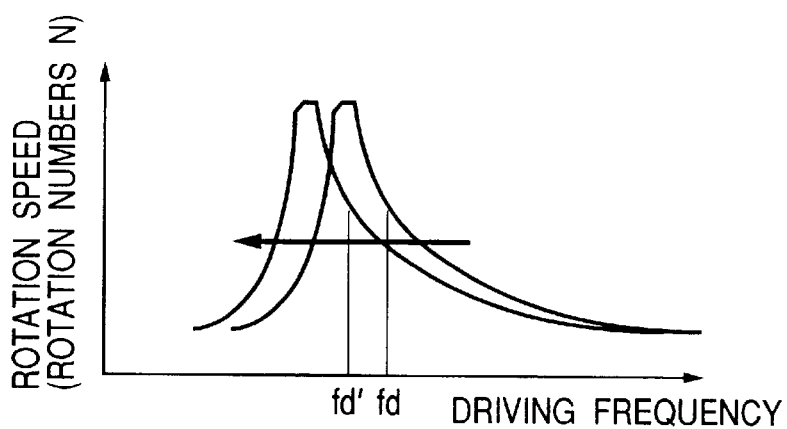
Figure 5C:
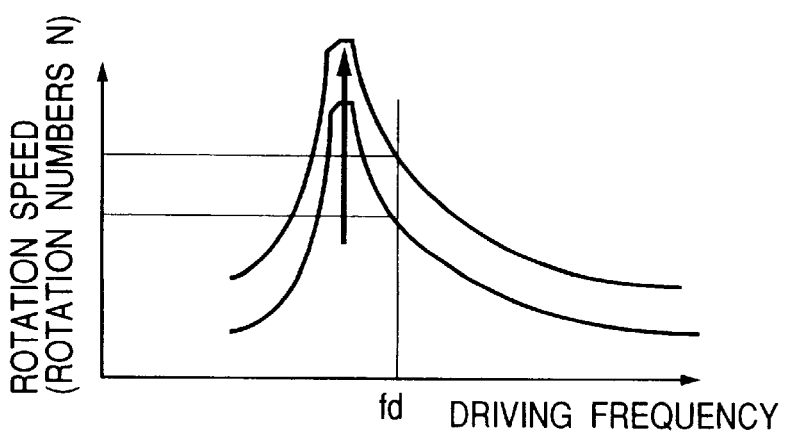

Here, the driving frequency and the driving speed of the vibration wave motor have a relation as shown in FIG. 5A. A curve showing this relation has characteristics in which the curve is moved in a direction shown by an arrow of FIG. 5B as the vibration wave motor rises in temperature. Further, since this curve is moved in a direction shown by an arrow of FIG. 5C by widening the driving pulse width (equivalent to a rise in voltage), it is sufficient to widen the driving pulse width to hold a constant rotation number of the vibration wave motor with respect to the above rise in temperature. However, there is a limit to correcting the rotational speed of the vibration wave motor by changing only the pulse width. Therefore, when a further/greater shift in these characteristics is made, no speed correction can correspondingly made.

Therefore, it is necessary to change the driving frequency so as to follow the rotational speed of the vibration wave motor. Namely, an operation of the vibration wave motor is controlled by changing the driving frequency when the rotational speed of the vibration wave motor follows the target speed while the rotational speed of the motor is greatly changed at accelerating from stoppage and decelerating times and switching the target speed, etc.

The vibration wave motor in this embodiment is used as a driving source of the photosensitive drums 342 to 345 and the transfer belt 333. Therefore, this motor is always rotated at a constant speed (hereinafter this is called a process speed) for forming a toner image while the recording paper sheet is conveyed on the transfer belt.

In this embodiment, the process speed is relatively lower than an upper limit of the rotational speed at which the vibration wave motor can be rotated. In particular, if the recording paper sheet is thick or is an OHP paper sheet, a heat quantity applied to the recording paper sheet must be increased when the toner image on the recording paper sheet is thermally fixed by the fixing device 334. Therefore, there is a tendency in which the process speed must be set to be further lower in comparison with the case in which the recording paper sheet is a plain paper sheet.

On the other hand, since frictional vibration energy caused by frictional movement between a rotor and a stator within the vibration wave motor generates a driving force, a structural problem of the vibration wave motor exists in that wearing of a frictional face of both these members can not be avoided. Therefore, a close contact area between the stator and the rotor increases due to wear between these members, and this increase becomes one index showing a degree of wear between the stator and the rotor.

Particularly, when the vibration wave motor is particularly rotated at relatively low speed, the close contact area is particularly greatly increased. In this case, there is a possibility that this increase has an influence on deterioration of characteristics showing stable rotation driving performance of the motor such as wf (wow and flutter) characteristics, etc. Therefore, it is also considered that the quality of a formed image is reduced in an image forming device using this motor, etc.

Such a close contact area between the rotor and the stator can be reduced to a certain extent by periodically, or at particular timings executing a higher speed rotation in comparison with the normal rotation. Thus, the inventors of this application have found that deterioration of the rotation driving performance of the vibration wave motor can be prevented or improved by this reduction.

Therefore, in this embodiment, as shown in FIG. 4, a high speed rotation operation execution portion 607 is provided such that the vibration wave motor as a driving source of the photosensitive drums 342 to 345 and the transfer belt 333 is rotated at high speed periodically or at particular timings.

In this embodiment, the high speed rotation operation execution portion 607 receives an instruction with respect to the execution of the high speed rotation operation from a CPU 611 so that the high speed rotation operation execution portion 607 sets a target speed at a high speed rotating time instructed by the CPU 611 in a target speed setting portion 605 and rotates the vibration wave motor at high speed.

Figure 6:
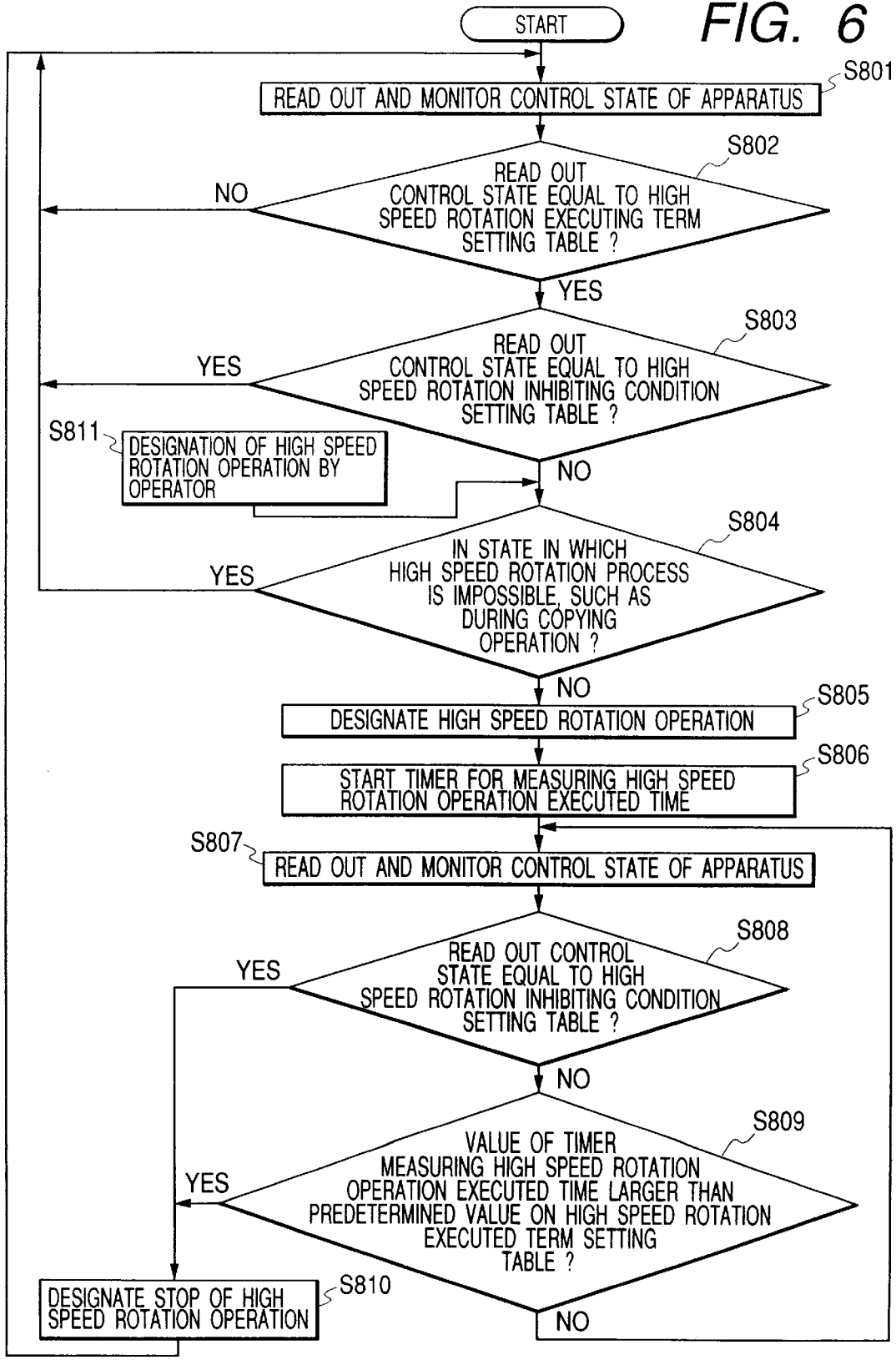
FIG. 6 is a flow chart showing a designation processing sequence with respect to the execution of a high speed rotation operation in the image forming device of FIG. 1.

Here, an instruction processing sequence with respect to the execution of the high speed rotation operation of the high speed rotation operation execution portion 607 performed in the CPU 611 will be explained in detail in accordance with a flow chart shown in FIG. 6.

In step S801, the CPU 611 monitors a control state of the image forming device and reads out state information while the CPU 611 communicates with the CPU 401 of the color reader portion. The CPU 611 also reads out a wf value of the vibration wave motor at a normal rotating time from a wf measurement portion 609, and sets this wf value as one parameter showing the control state of the image forming device. Here, the wf value is an index showing dispersion of speed information read out from a speed detection portion 608 per unit time.

In step S802, the control state of the image forming device as a monitoring result in step S801 is collated with condition information with respect to a high speed rotation executing term described in a high speed rotation executing condition setting table 613 recorded in a RAM 612 capable of being accessed by the CPU 611.

If no conditions conform to each other as a result of this collation, flow is returned to step S801. In contrast to this, if the conditions conform to each other as a result of the collation, flow proceeds to step S803. The high speed rotation executing condition setting table 613 is formed by recording one or plural data obtained by combining information with respect to the following (a) to (c):

(a) the control state of the image forming device when the high speed rotation is started, (b) a high speed rotation operation continuing time, and (c) an executing interval time for designating a start of a high speed rotation when execution is periodically performed regardless of the control state of the image forming device.

FIG. 7 shows one embodiment of the high speed rotation executing condition setting table 613. Namely, flow proceeds to step S803 when the control state read out in step S801 satisfies the condition shown in (a) of FIG. 7.

In step S803, the control state of the image forming device as a monitoring result in step S801 is collated with condition information with respect to an inhibiting period of the high speed rotation execution described in a high speed rotation inhibiting condition setting table 614 recorded in RAM 612 capable of being accessed by the CPU 611.

If no conditions conform to each other as a result of this collation, flow proceeds to step S804. In contrast to this, if the conditions conform to each other as a result of this collation, it is determined that no high speed rotation operation can be performed, and flow is returned to step S801.

The high speed rotation inhibiting condition setting table 614 is formed by recording one or plural data obtained by combining information with respect to the control state of the image forming device in which the execution of the high speed rotation operation is inhibited. FIG. 8 shows one embodiment of the high speed rotation inhibiting condition setting table 614. Accordingly, the high speed rotation operation is inhibited during the image forming operation.

In step S804, it is determined whether no high speed rotation processing including a copying operation can be performed or not. Namely, there is the case in which an operator designates a high speed rotation operation by a manual operation in step S811. Accordingly, when there is information of this interruption and, e.g., a high speed rotation operation is designated during the copying operation, no high speed rotation can be performed, and flow is returned to step S801.

In step S805, the CPU 611 designates the execution of a high speed rotation operation to the high speed rotation operation executing portion 607. Concretely, a start of execution of a high speed rotation operation is designated after a high rotational speed setting value (higher than a speed at a time of the normal copying operation) 615 recorded in RAM 612 capable of being accessed by the CPU 611 is transmitted to the high speed rotation operation executing portion 607. Here, the high rotational speed setting value 615 transmitted to the high speed rotation operation executing portion 607 becomes a target speed at a high speed rotation time set in the target speed setting portion 605 by the high speed rotation operation executing portion 607. When execution of a high speed rotation operation is designated in step S805, the motor starts a high speed rotation and the process subsequently proceeds to step S806.

In step S806, a timer for measuring the high speed rotation operation continuing time is started simultaneously when execution of the high speed rotation operation is started.

In step S807, similar to step S801, the CPU 611 monitors the control state of the image forming device in this embodiment and subsequently reads out state information while the CPU 611 communicates with the CPU 401 of the color reader portion.

In next step S808, similar to step S803, the control state of the image forming device as a monitoring result in step S807 is collated with condition information with respect to an inhibiting term of the execution of the high speed rotation described in the high speed rotation inhibiting condition setting table 614 recorded in RAM 612, capable of being accessed by the CPU 611.

If no conditions conform to each other as a result of this collation, flow proceeds to step S809. In contrast to this, if the conditions conform to each other as a result of this collation, flow proceeds to step S810 to rapidly interrupt the high speed rotation operation.

In step S810, the CPU 611 designates stoppage of the execution of the high speed rotation operation a the high speed rotation operation executing portion 607. The high speed rotation operation executing portion 607 receiving the designation of the stoppage of the execution of the high speed rotation operation from the CPU 611 rapidly stops the operation of the vibration wave motor while the high speed rotation operation executing portion 607 gradually sets the target speed to a lower speed. Flow is then returned to step S801, so as to again perform a monitoring operation for executing a high speed rotation operation.

In contrast to this, in step S809, a timer value for measurement of the high speed rotation operation continuing time started in step S806 is compared with a high speed rotation operation continuing time shown in (b) of FIG. 7 in the high speed rotation executing condition setting table 613. If the timer value reaches the high speed rotation operation continuing time of (b) in FIG. 7, flow proceeds to step S810 to stop the high speed rotation operation.

In contrast to this, if no timer value reaches the high speed rotation operation continuing time of (b) in FIG. 7, the high speed rotation operation is continued and the process is returned to step S807.

When high speed rotation processing according to the high speed rotation executing condition setting table 613 and the high speed rotation inhibiting condition setting table 614 recorded in RAM 612 is performed in accordance with the above designation processing sequence with respect to the execution of the high speed rotation operation, the high speed rotation operation of the vibration wave motor is generally performed as follows in this embodiment.

In condition (1), a high speed rotation operation is executed for one minute just after power of the vibration wave motor is turned on.

In condition (2), a high speed rotation operation is executed for thirty seconds after a panel operation for executing the image formation is started by an operator.

In condition (3), a high speed rotation operation is executed for ten seconds after an image formation preparation signal is input from the facsimile apparatus 501 through an exterior I/F.

In condition (4), a high speed rotation operation is executed for ten seconds after an image formation preparation signal is input from the LAN interface apparatus 502 through the exterior I/F.

In condition (5), a high speed rotation operation is executed for ten seconds after an image formation preparation signal is input from the printer format apparatus 503 through the exterior I/F.

In condition (6), a high speed rotation operation is executed for thirty seconds regardless of the control state for every two hours after the power of the vibration wave motor is turned on.

In condition (7), a high speed rotation operation is executed for one minute just after image formation when a wf value read out from the wf measurement portion 509 during a constant speed rotation is equal to or greater than a certain predetermined value.

In condition (8), a high speed rotation operation is terminated or interrupted in each case until just before image formation is started.

In this embodiment, the operator can change contents of the high speed rotation executing condition setting table 613 recorded in RAM 612 through the operation portion 402.

FIG. 9 shows one example of an operation screen for changing the contents of the high speed rotation executing condition setting table 613 on a liquid crystal screen of the operation portion 402. The operator can freely execute a selection of the execution of a high speed rotation of the vibration wave motor, and a correction, an addition and a deletion of a high speed rotation executing term for executing a high speed rotation of the vibration wave motor by pressing a touch panel of the operation portion 402.

The CPU 401 notifies the CPU 611 of information with respect to a change in contents of the high speed rotation executing condition setting table 613 on the basis of the selection input by the operator. Further, the CPU 611 changes the contents of the high speed rotation executing condition setting table 613 recorded in RAM 612 in accordance with these notified contents.

Further, in this embodiment the operator can designate a start of execution of high speed rotation processing at particular timings through the operation portion 402.

FIG. 10 shows one example of an operation screen for designating the execution of a high speed rotation on the liquid crystal screen of the operation portion 402. The operator can designate a start of an execution of a high speed rotation processing of the vibration wave motor by pressing the touch panel of the operation portion 402. The CPU 401 notifies the CPU 611 of a start of execution of high speed rotation processing on the basis of a designation of the operator. Further, the CPU 611 executes high speed rotation processing only when no current control state of the image forming device is opposed to a high speed rotation inhibiting condition shown in the high speed rotation inhibiting condition setting table 614 (from S811 to S804 in FIG. 6).

Further, in this embodiment, the contents of the high speed rotation inhibiting condition setting table 614 recorded in RAM 612 through operation portion 402 can be changed by only a certain limited operator (hereinafter called a special operator), such as an apparatus manager, a service personnel, etc.

Figure 11:
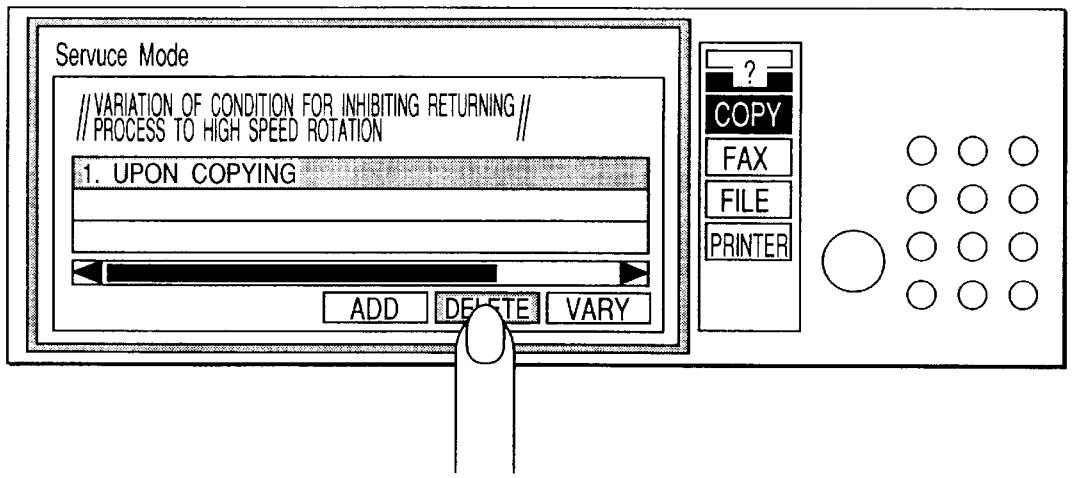
FIG. 11 is a view showing one example of an operation screen for changing contents of the high speed rotation inhibiting condition setting table of the image forming device of FIG. 1.

FIG. 11 shows one embodiment of an operation screen for changing the contents of the high speed rotation inhibiting condition setting table 614 on the liquid crystal screen of a special operation portion 402. The special operator can freely execute a correction, an addition and a deletion of a high speed rotation inhibiting condition with respect to the high speed rotation processing of the vibration wave motor by pressing the touch panel of the operation portion 402. The CPU 401 notifies the CPU 611 of information with respect to a change in contents of the high speed rotation inhibiting condition setting table 614 on the basis of a selection input by the special operator. Further, the CPU 611 changes the contents of the high speed rotation inhibiting condition setting table 614 recorded in RAM 612 in accordance with the notified contents.

Figure 12:
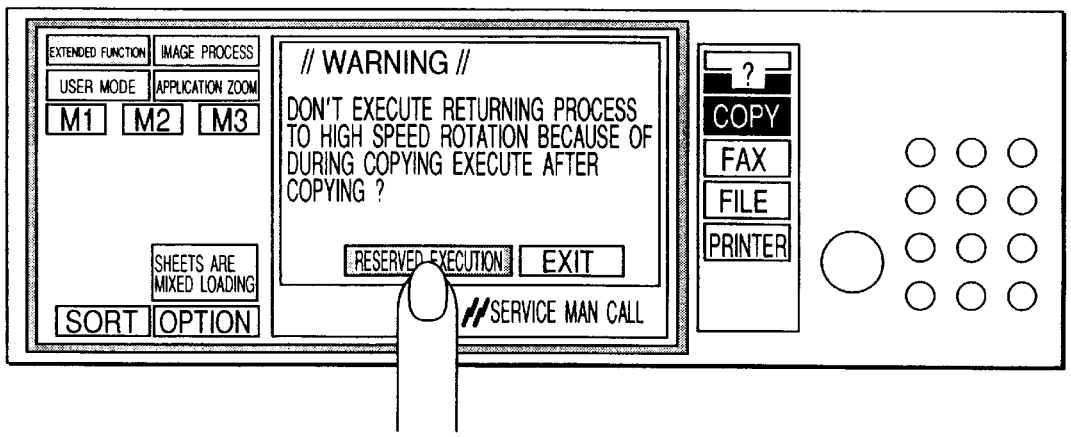
FIG. 12 is a view showing one example of an operation portion liquid crystal display screen for inhibiting the start of an image forming operation during high speed rotation execution of the image forming device of FIG. 1.

Here, there is a possibility that a fatal failure maybe caused by these changed contents in this embodiment. Therefore, it is necessary to sufficiently consider the changed contents. There may also be the case in which a normal image forming operation is obstructed by set contents of the high speed rotation inhibiting condition setting table 614 by executing high speed rotation processing so that no execution can be started. In this case, in this embodiment, as shown in FIG. 12, a warning screen is displayed in the operation portion 402 and an error in operation is prevented by inhibiting the start of an image forming operation.

When the high speed rotation operation is executed in this embodiment, a target speed set in target speed setting portion 605 by the high speed rotation operation executing portion 607 is a high rotational speed setting value 615 recorded in RAM 612.

This high rotational speed setting value 615 is set to be large as an initial value in comparison with the target speed set at the normal operating time. However, it is more effective to set as high a speed as possible so as to prevent or improve the risk of deterioration of rotation driving performance of the vibration wave motor due to the high speed rotation operation.

In contrast to this, there is a relation as shown in FIG. 5A between the driving frequency and the driving speed as driving control amounts of the vibration wave motor. When the driving frequency is gradually reduced, the driving speed is correspondingly accelerated. However, when the driving frequency is smaller than a certain frequency (hereinafter called a peak frequency) shown by an arrow/leadline 701 of FIG. 5A, no rotational speed of the vibration wave motor can follow the driving frequency so that no stable driving characteristics can be obtained.

As described above, in consideration of effects with respect to the improvement of the rotation driving performance of the vibration wave motor in the high speed rotation operation, it is considered to be ideal that the vibration wave motor is operated at a rotational speed provided when the peak frequency is set at a control amount.

However, it is known that there are individual differences in the peak frequency and the rotational speed of this peak frequency among individual vibration wave motors. Accordingly, it is impossible to uniformly determine an optimum high rotational speed setting value 615 at the high speed rotating time with respect to all of the vibration wave motors.

Therefore, in this embodiment, an optimum high rotational speed setting value 615 at a high speed rotation operation time with respect to each of the individual vibration wave motors can be measured by a maximum rotational speed measurement portion 610.

Figure 13:
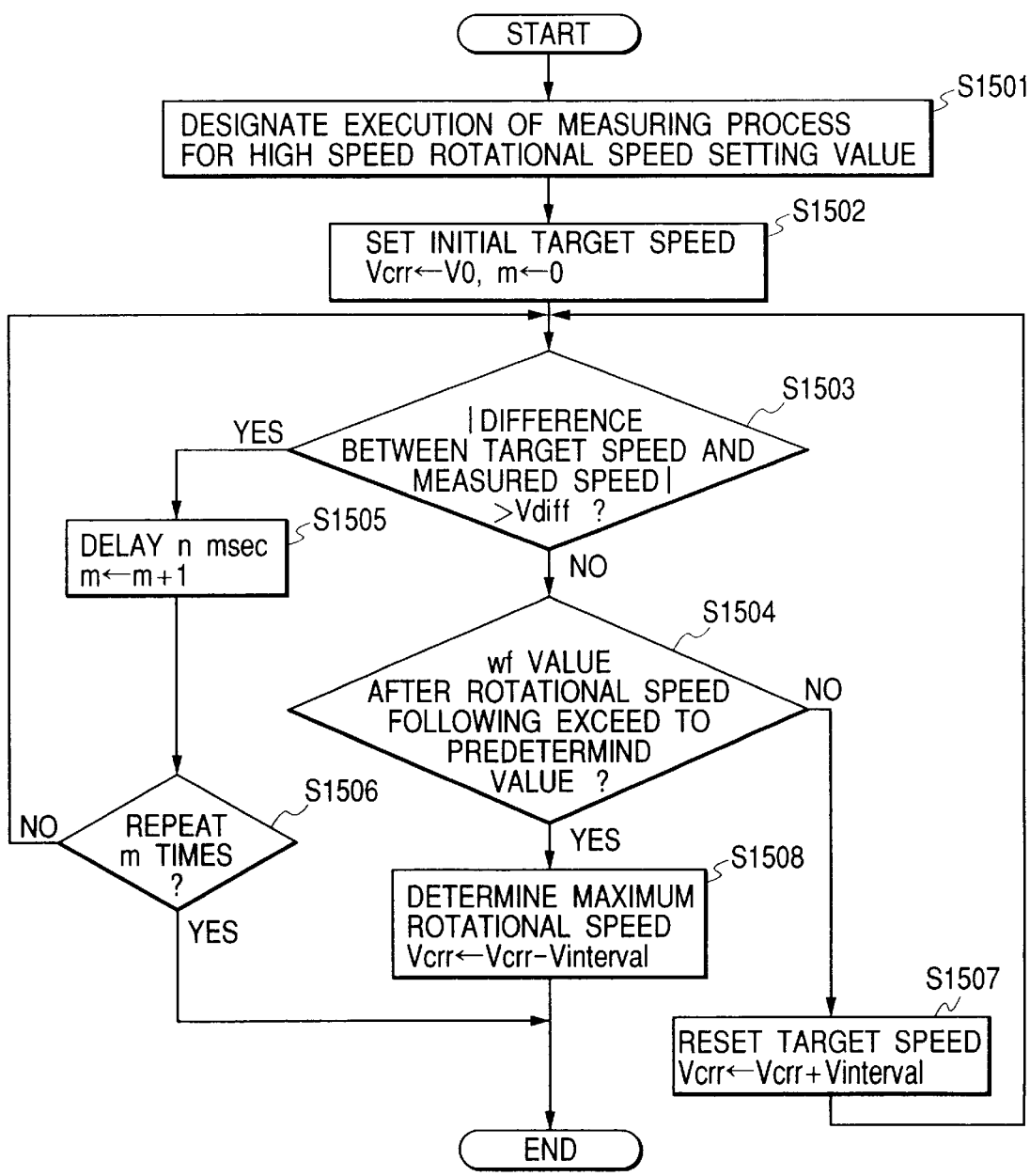
FIG. 13 is a flow chart showing a processing sequence for measuring a high rotational speed setting value of FIG. 4.

A processing sequence for measuring the high rotational speed setting value 615 by the maximum rotational speed measurement portion 610 will next be explained in detail in accordance with a flow chart of FIG. 13. Note that the following processing sequence for measuring the high rotational speed setting value 615 is periodically executed in consideration of an initial using time or a change in control characteristics of the vibration wave motor with the passage of time.

In step S1501, execution of a measurement of the high rotational speed setting value 615 at the high speed rotation operation time is designated from the CPU 611 to the maximum rotational speed measurement portion 610. In accordance with this designation, measurement execution processing of the high rotational speed setting value 615 at the high speed rotation operation time is started in the maximum rotational speed measurement portion 610 after step S1502.

In step S1502, a rotational speed $V_0$ lower than a rotational speed at normal time is set as an initial target speed shown in FIG. 5A in a setting portion 605 as the current target speed $V_{crr}$. Further, a delay processing executing number counting value m until speed following of steps S1503, S1505 and S1506 is initialized to zero.

In step S1503, the rotational speed $V_{crr}$ set in the target speed setting portion 605 is compared with the current rotational speed obtained from the speed detecting portion 608, and it is detected whether or not the difference between these rotational speeds is smaller than an arbitrary preset value $V_{diff}$ determined in advance. If this condition is satisfied, flow proceeds to step S1504. In contrast to this, if this condition is not satisfied, it is determined that no speed following is performed. After a delay operation is then performed for a time n [msec] in step S1505 and the number of delay executing times m [times] is counted, flow again proceeds to step S1506.

In step S1506, when the number of executing times m [times] of the delay of the time n [msec] exceeds an arbitrary prescribed value determined in advance, it is determined that no speed following can be performed regardless of a speed following time, and repeating processings of steps S1503, S1505 and S1506 are terminated and flow proceeds to step S1508.

On the other hand, the wf value is read out of the wf measurement portion 609 in step S1504. When the difference between the rotational speed $V_{crr}$ set in the target speed setting portion 605 and the current rotational speed obtained from the speed detection portion 608 is equal to or smaller than the certain predetermined value $V_{diff}$ and the wf value is still equal to or smaller than a certain predetermined value, it is determined that stable rotation is performed and flow proceeds to step S1507.

In step S1507, a new target speed obtained by increasing the target speed by an amount of $V_{interval}$ from the current target speed $V_{crr}$ is set in the target speed setting portion 605 and flow again moves to step S1503.

In contrast to this, when the wf value is equal to or greater than the certain predetermined value in step S1504, it is determined that no stable rotation is performed and flow proceeds to step S1508. Namely, processings of steps S1503, S1504 and S1507 are repeatedly executed while the target speed of the vibration wave motor is gradually increased and stable rotation is performed. When no stable rotation has been performed, flow proceeds to step S1508.

In step S1508, it is determined that a target speed provided by one cycle before the speed $V_{crr}$ at which no stable rotation has been performed, i.e., $V_{crr}-V_{interval}$ is a maximum rotational speed capable of performing stable rotation of the vibration wave motor.

The CPU 611 records a speed subtracted by $V_{margin}$ as a safety coefficient from the maximum rotational speed obtained in the maximum rotational speed measurement portion 610 in RAM 612 as a high rotational speed setting value 615.

In the above embodiment, a high speed rotation processing is performed in the case of the conditions (1) to (8) in accordance with the high speed rotation executing condition setting table 613 and the high speed rotation inhibiting condition setting table 614. However, contents of the high speed rotation executing condition setting table 613 and the high speed rotation inhibiting condition setting table 614 are not necessarily limited to those in this embodiment. If these contents are set so as not to have an influence on the normal operation, the contents of these tables can be naturally changed.

In the above embodiment, the processing sequence for measuring the high rotational speed setting value 615 by the maximum rotational speed measurement portion 610 is periodically executed in consideration of the initial using time or the change in control characteristics of the vibration wave motor with the passage of time. However, the processing sequence can also be executed by designating the execution of this processing from the operation portion by an operator or a special operator in consideration of a matter of difficulty in determining the existence and nonexistence of the change in control characteristics of the vibration wave motor with the passage of time.

In the above embodiment, the wf value during the constant speed rotation of the vibration wave motor is used as an index for determining whether or the the vibration wave motor is stably rotated. However, another measurement value generally showing stable rotating performance of the motor can be naturally used instead of the wf value as another target showing the stable rotating performance of the motor.

In the above embodiment, an image forming device using a vibration wave motor controlled by a speed feedback control method has been described. However, a similar mechanism can be naturally applied to a general controller which is not necessarily an image forming device.

In the above embodiment, an image forming device in a photosensitive system using plural photosensitive drums has been described. However, the present invention can be also naturally applied to an image forming device in which a photosensitive operation is performed by a single photosensitive drum.

In the above embodiment, an image forming device in a transfer system using a transfer belt has been described. However, the present invention may also be applied to an image forming device in which a transfer operation is performed using a transfer drum instead of the transfer belt.

In the above embodiment, an image forming device using a vibration wave motor in a photosensitive drum driving system and a transfer belt driving system has been described. However, a similar mechanism can be also naturally applied to a motor driving system except for these driving systems.

What is claimed is:

1. A device comprising:
a vibration wave motor including a rotor and a stator and constituting a drive source that performs a predetermined operation;
a speed adjusting circuit which drives said vibration wave motor at a predetermined speed to perform the predetermined operation, said speed adjusting circuit also having a high speed mode for driving said vibration wave motor at a speed higher than the predetermined speed for performing the predetermined operation, the speed in said high speed mode being a speed selected for improving a condition of a frictional interface between the rotor and the stator of said vibrating wave motor; and
a high speed driving judging circuit which detects a use or operation state of the device or a rotating state of the vibration wave motor and allows driving of the vibration wave motor in the high speed mode when said high speed driving judging circuit determines that the use or operation state of the device or the rotating state of the vibration wave motor is a predetermined state.

2. A device according to claim 1, wherein the speed of the vibration wave motor in the high speed mode is higher than a speed used in a normal operation of the device.

3. A device according to claim 1, wherein said speed adjusting circuit drives the motor for a predetermined time at high speed in the high speed mode.

4. A device according to claim 1, wherein said device is an image forming device in which a speed of the motor when rotating at the predetermined speed with said vibration wave motor as a driving source is set to a process speed of image formation.

5. A device according to claim 1, wherein said high speed driving judging circuit determines whether high speed driving is allowed or not by comparing one or plural preset conditions with the use or operation state of the device detected by said high speed driving judging circuit.

6. A device according to claim 1, wherein said high speed driving judging circuit does not allow high speed driving when said high speed driving judging circuit detects said device is in a state in which the device performs a main operation.

7. A device according to claim 1, wherein said high speed driving judging circuit allows high speed driving when said high speed driving judging circuit detects the device is in an operation state preparatory to a main operation of the device.

8. A device according to claim 5, wherein said one or plural conditions are stored in memory.

9. A device according to claim 5, wherein the device further comprises display means for displaying the use or operation state of the device detected by said high speed driving judging circuit.

10. A device according to claim 1, wherein said device further comprises a vibration wave motor stable rotation detecting circuit which detects whether the vibration wave motor is stably rotated at a constant speed for a period of time, and said high speed driving judging circuit allows high speed driving when the vibration wave motor stable rotation detecting circuit determines that the vibration wave motor is not stably rotated.

11. A device according to claim 10, wherein said vibration wave motor stable rotation detecting circuit is a detecting circuit that detects a wow and flutter characteristic value of the vibration wave motor.

12. A device according to claim 1, wherein the device further comprises a stopping circuit which stops a driving operation of the vibration wave motor in the high speed mode when said high speed driving judging circuit determines that the use or operation state of the device has become a predetermined inhibiting state during the driving operation of the vibration wave motor in the high speed mode.

13. A device according to claim 1, wherein said high speed driving judging circuit allows driving of the vibration wave motor in the high speed mode just after power to the device is turned on.

14. A device according to claim 1, wherein said high speed driving judging circuit allows driving of the vibration wave motor in the high speed mode just before a main operation is started by the device.

15. A device according to claim 1, wherein a driving speed of the vibration wave motor in the high speed mode is determined in accordance with a maximum speed at which the motor can stably rotate.

16. A device according to claim 4, wherein said high speed driving judging circuit does not allow high speed mode driving during an image formation operation.

17. A device according to claim 15, wherein said high speed driving judging circuit allows high speed mode driving in a state preparatory to execution of an image forming operation.

18. A device according to claim 17, wherein said high speed driving circuit allows high speed mode driving when an image forming operation preparation signal is input from an exterior apparatus.

19. A device according to claim 18, wherein said exterior apparatus is a facsimile apparatus.

20. A device according to claim 18, wherein said exterior apparatus is a LAN interface apparatus.

21. A device according to claim 18, wherein said exterior apparatus is a printer format apparatus.

22. A device comprising:

a vibration wave motor including a rotor and a stator and constituting a driving source for performing a predetermined operation;

a speed adjusting circuit which drives said vibration wave motor at a predetermined speed to perform the predetermined operation;

a driving circuit which drives said vibration wave motor in a predetermined manner so as to improve a condition of a frictional interface between said rotor and said stator of said vibration wave motor;

a judging circuit which detects a use or operation state of the device or a rotating state of the vibration wave motor, and determines whether the use or operation state of the device or the rotating state of the vibration wave motor conforms to one or plural predetermined conditions; and a control circuit which allows an operation of said driving circuit when said judging circuit determines that the state detected conforms to said one or plural conditions.

23. A device according to claim 22, wherein said device performs plural processings and said judging circuit determines that the state detected does not conform to said one or plural conditions during execution of a specific processing among the plural processings.

24. A device according to claim 22, wherein said judging circuit determines that the state detected conforms to said one or plural conditions at a time of turning on power to the device.

25. A device according to claim 22, wherein said one or plural conditions are stored in memory.

* * * * *

UNITED STATES PATENT AND TRADEMARK OFFICE
CERTIFICATE OF CORRECTION

PATENT NO. : 6,384,511 B1
DATED : May 7, 2002
INVENTOR(S) : Akihiko Sakai

It is certified that error appears in the above-identified patent and that said Letters Patent is hereby corrected as shown below:

<u>Column 2,</u>
Line 60, "FIG. 1;" should read -- FIG. 1; and --.

<u>Column 5,</u>
Line 65, (close up the left margin).
Line 66, (close up the right margin).

<u>Column 6,</u>
Line 3, "this application" should read -- the present invention --.

<u>Column 7,</u>
Line 56, "a" should read -- in --.

<u>Column 13,</u>
Line 34, "claim 15," should read -- claim 4, --.

Signed and Sealed this

Twenty-ninth Day of October, 2002

*Attest:*

*Attesting Officer*

JAMES E. ROGAN
*Director of the United States Patent and Trademark Office*